Oct. 8, 1946.  L. HAMMOND  2,408,929
STEERING APPARATUS
Filed Oct. 28, 1942
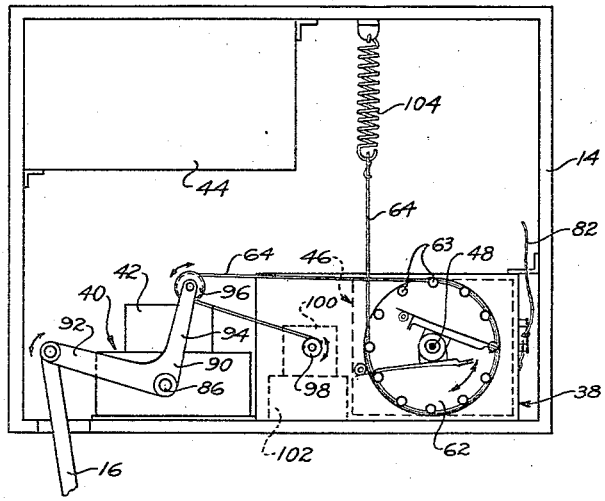
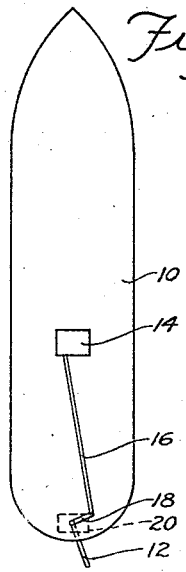
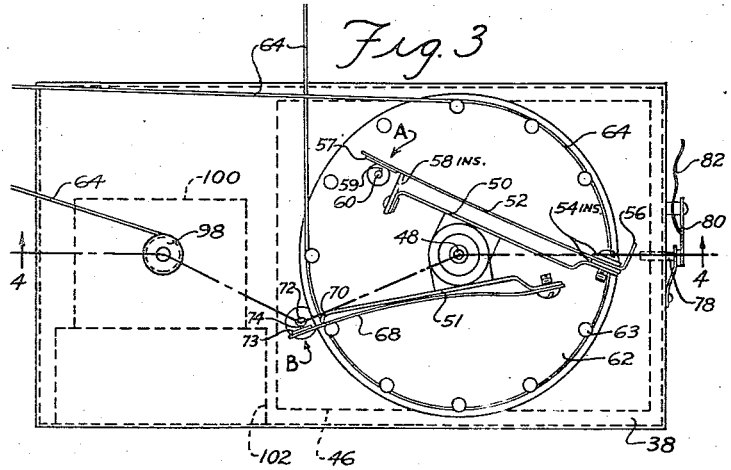
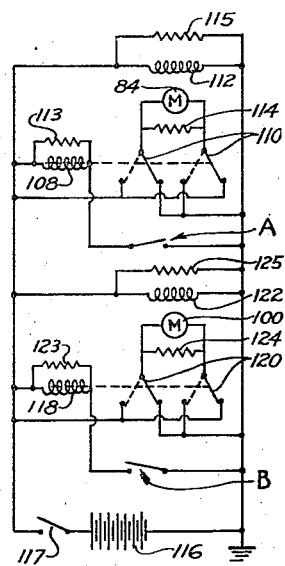
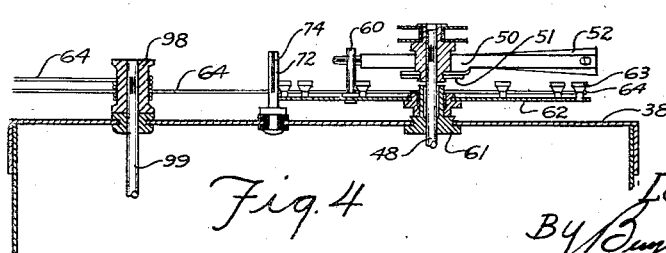
Inventor
Laurens Hammond
By Benjamin␣␣␣␣␣␣
Atty.

Patented Oct. 8, 1946

2,408,929

UNITED STATES PATENT OFFICE 2,408,929

STEERING APPARATUS

Laurens Hammond, Chicago, Ill.

Application October 28, 1942, Serial No. 463,642

18 Claims. (Cl. 114—144)

My invention relates generally to control apparatus, and more particularly to improved mechanisms for automatically steering a ship, glider, marine torpedo, airplane, or the like.

It is an object of my invention to provide an improved automatic steering control mechanism in which means are provided to correct for several causes of cumulative error usually present in such mechanisms.

A further object is to provide an improved automatic steering control apparatus in which correction is made for the deviation of the vessel from the desired course due to the trim of the vessel or due to other factors which are not random in character.

A further object is to provide an improved follow-up type steering mechanism having trim correcting means.

A further object is to provide an improved automatic steering control mechanism which will maintain a vessel, aircraft, torpedo or the like on a predetermined course with a high degree of accuracy.

A further object is to provide an improved automatic pilot mechanism for aircraft, ships and the like, which is simple in construction, which may be economically manufactured, and which will operate with a high degree of accuracy.

Other objects will appear from the following description, reference being had to the accompanying drawing in which:

Figure 1 is a plan view of a vessel incorporating the improved steering control mechanism of the invention;

Figure 2 is a plan view of the control mechanism box with cover removed;

Figure 3 is an enlarged plan view of a portion of the mechanism shown in Fig. 2;

Figure 4 is a sectional view taken on the line 4—4 of Figure 3; and

Figure 5 is a simplified wiring diagram of the apparatus.

Stated in general terms, the steering apparatus of the invention comprises a compass element having a follow-up member associated therewith. Relative rotation between the compass element and the follow-up member due to a change in orientation of the vessel results in the operation of an electrical switch which controls a reversing servo-motor connected to position the rudder or other steering control. A second switch is operated in response to the orientation of the compass element with respect to the vessel. This second switch controls a mechanism which has the ultimate effect of correcting for factors, inherent in the trim of the vessel or present due to external forces acting on the vessel, which would otherwise tend to cause the vessel to veer to one side of the desired course more than to the other side.

The invention is illustrated as applied to the steering of a vessel 10 having a rudder 12. The position of the rudder is controlled by automatic steering mechanism contained within a box 14. An operating link 16 extends from the box 14 and has its end pivotally connected to a tiller arm 18 which is adapted to control the position of the rudder through a servo-motor 20. When the invention is utilized for steering aircraft, gliders, marine torpedoes and other dirigible devices which do not require the application of large forces to the steering control surfaces, the servo-motor 20 may be omitted and the operating link 16 connected directly to the rudder or other steering device.

As best shown in Figs. 2 and 3, the control box 14 contains a gyro-compass mechanism housing 38, a servo-motor and speed reducing gear housing 40, a relay box 42, and a battery box 44. Within the housing 38 is a gyro-compass 46 having a vertical gimbal shaft 48 which is maintained in a predetermined orientation by the directional gyroscope 46. While a gyroscope is the preferred mechanism for maintaining the shaft 48 in a predetermined orientation, any other suitable compass mechanism might be substituted for the gyro-compass mechanism 46 to accomplish this purpose. A gyro-compass mechanism suitable for use in this apparatus is disclosed in my copending application Serial No. 463,643, filed October 28, 1942.

A pair of switch brackets 50, 51 is rigidly secured to the shaft 48, being electrically connected to the shaft and thus grounded. The bracket 50 has a long flexible resilient switch arm 52 secured thereto but insulated therefrom by suitable washers 54. The switch arm 52 has a soldering lug 56 for attachment of a suitable flexible connecting wire. The switch arm 52 is biased to the position in which it is shown in Fig. 3, with its free end abutting against an insulating stop riveted to the bracket 50. The outer end of the switch arm 52, which may be made of phosphor bronze or similar resilient conductor, has a contact wire 57 welded thereto, and is adapted to make contact with a contact wire 59 welded to a post 60. The contact wires 57, 59 are preferably made of a suitable electrical contact material, such as a platinum alloy.

The post 60 is riveted to a follow-up pulley 62 which is mounted for free rotation on the bearing bushing 61 for shaft 48. The pulley 62 has a plurality of pins 63 forming a guide for a cord or stranded flexible wire 64. The follow-up pulley 62 is grounded to its supporting casing 38 through its bearing bushing 61. The switch arm 52 is thus connected to ground when it makes contact with the post 60.

The bracket 51 has a long flexible resilient switch arm 68 secured thereto. The arm 68 is in electrical connection with the bracket 51 and is biased to engage a positioning stop portion 70 of the bracket 51. The end of the switch arm 68 cooperates with a contact post 72 which is secured to but electrically insulated from the top of the casing 38. These parts preferably have platinum or similar corrosion resistant contact wires 73, 74 welded thereto.

For convenience, the switch formed by the arm 52 and its associated parts will be hereinafter referred to as switch A, while the switch formed by the arm 68 and its cooperating parts will be referred to as switch B. The switch arm 52 permits considerable clockwise movement of the pulley 62 with respect to the shaft 48, while the switch 68 similarly may flex to permit considerable counterclockwise movement of the housing 38 with respect to the shaft 48.

Suitable means are provided for caging the directional gyro mechanism 46, such means being illustrated as a spring ejected pin 78 normally held in caging position by a latch 80 which may be moved to pin releasing position by pulling a control cord 82.

Within the servo-motor casing 40 is a servo-motor 84 which is illustrated in Fig. 5 as being a reversing direct current motor. This motor is connected by suitable speed reducing gearing to a shaft 86 to which a bell crank 90 is secured, the bell crank having an arm 92 which, at its end, is pivotally connected to the operating link 16, the other arm 94 of the bell crank 90 carrying a pulley 96.

A capstan 98, secured to a shaft 99, is driven through suitable speed reducing gearing from a capstan motor 100 which has associated therewith a relay box 102. The cord, or stranded flexible wire 64, has one end secured to the capstan 98 and passes successively around the pulley 96 and the follow-up pulley 62, being maintained under tension by a tension coil spring 104 which is suitably anchored to the wall of the box 14.

As shown in Fig. 5, closure of the switch A results in energization of a relay (contained within relay box 42), having a winding 108, and operating a double-pole double-throw reversing switch 110. The motor 84 has a shunt field winding 112. Anti-spark resistors 113, 114 and 115 are connected respectively in parallel with the relay winding 108, the motor armature 84, and the field winding 112. It will be noted that the relay switch 110 is arranged to reverse the direction of flow of current from a battery 116 through the armature of motor 84. A main switch 117 is closed by a pull on the release cord 82 or in any other suitable manner.

The closure of switch B energizes a relay having a winding 118 (contained in relay box 102), operating a double-pole double-throw reversing switch 120 which controls the direction of flow of current through the armature of the motor 100. The motor 100 has a shunt field 122. Anti-spark resistors 123, 124 and 125 are respectively connected in parallel with the relay winding 118, armature winding of motor 100 and field winding 122, these anti-spark resistors, as well as the anti-spark resistors 113, 114, and 115, being provided to inhibit arcing upon opening and closing the switches in their associated circuits.

In describing the operation of the apparatus, it will be assumed that the gyro-compass mechanism is in operation but is held caged by the caging pin 78. To utilize the apparatus the pilot will first manually steer the vessel 10 until it is exactly on the desired course. At the instant that the vessel is on the course the pilot will pull the release cord 82 to move the latch 80 from obstructing position and permit the caging pin to spring outwardly to uncage the gyro. Thereafter the shaft 48 carrying the brackets 50 and 51 will maintain its orientation. Pulling the release cord 82 may also be made to effect closure of the main switch 117.

For the purposes of the ensuing description of the operation of the apparatus the following directional relationships will be assumed to be present, although it will be clear to those skilled in the art that the switches A, B, relays 108, 118, and the control mechanisms may be arranged to operate in various different ways and directions but nevertheless obtain the same end result. When switch A is closed and relay 108 energized, the motor 84 will operate in a direction to cause rotation of shaft 86 counterclockwise and thus to cause the rudder 12 to swing clockwise, while during the time that the switch A is open, shaft 86 rotates clockwise and the rudder swings counterclockwise. When switch B is closed and relay 118 energized, the motor 100 will operate in a direction to cause the capstan 98 to rotate slowly in a clockwise direction, while when switch B is open the capstan 98 will be rotating slowly counterclockwise.

It will be assumed that the gyro-compass mechanism has been uncaged while the vessel 10 is heading on its predetermined course, and that the vessel is then subjected to wind or other force which tends to cause the vessel to veer to the right of the predetermined course, or, that due to practically unavoidable irregularities in the design, construction or loading of the vessel, it is not in exact trim, and thus tends to veer from its predetermined heading in this manner. Under these circumstances the switch A will close and temporarily remain closed, since the switch arm 52 is flexible and can yield sufficiently to permit temporary changes in heading of the vessel to any extent which is probable. Closure of the switch A results in energization of the relay 108 and operation of the switches 110 which cause the servo-motor 84 to rotate in a direction which will swing the bell crank lever 90 counterclockwise, whereby the rudder 12 will be swung to the left (clockwise) to cause the vessel to return toward its predetermined heading. It will be noted that counterclockwise movement of the bell crank lever 90 will, through the cord 64, rotate the follow-up pulley 62 counterclockwise, and thus tend to move the contact 59, 60 away from the contact 57, 52, to open the switch A. The follow-up ratio may be in the order of 6:1. As used herein, the "follow-up ratio" of an automatic steering apparatus for vehicles is the ratio of the angular displacement of the vehicle from its original heading to the angular displacement of the steering element (e. g. rudder) produced by the apparatus in response to such change in heading of the vehicle.

The initial veering of the vessel to the right of its predetermined heading will also cause the switch B to open. When the switch B opens, the relay 118 is de-energized, the switches 120 return to the positions in which they are shown in Fig. 5, and the capstan motor 100 rotates in a direction such that the capstan 98 will rotate counterclockwise to unwind the cord 64 and tend to permit the slack take-up spring 104 to move the follow-up pulley 62 clockwise, thereby increasing the length of time that the switch A remains closed as compared with the time it would have remained closed were the capstan and its motor not provided. While the unwinding of the cord from the capstan tends to result in the rotation of the follow-up pulley 62 in a clockwise direction, this may not be the actual case since the movement of the bell crank 90 in a counterclockwise direction may be at a more rapid rate and have a greater effect upon the movement of the follow-up pulley 62 than does the rotation of the capstan 98. This is because the capstan 98 is of such diameter and rotates at such speed that it has a lesser effect upon the movement of the follow-up pulley 62 than does the servo-motor bell crank 90. For example, the effectiveness of the operation of the capstan motor 100 relative to the effectiveness of the servo-motor 84 in producing angular displacement of the follow-up pulley 62 may be in a ratio of the order of 1:50 or 1:100, depending mainly upon the dynamic characteristics of the vessel and its control surfaces, i. e., the degree of response of the vessel to its rudder.

From the foregoing it will be apparent that under the assumed condition where the wind or other force caused the vessel to veer to the right of the predetermined heading, the rudder 12 will swing to the left (clockwise) through a sufficient angle to cause the vessel to return to its predetermined heading, and that due to the switch B and capstan 98 controlled thereby, it will continue to swing through the predetermined heading to a heading slightly to the left of the predetermined heading. Veering of the vessel to the left of the predetermined heading will of course result in movement of the parts in opposite directions.

The principles of operation of the apparatus may possibly be best described by comparison with the manner of operation of the generally known type of automatic steering apparatus in which a follow-up mechanism is employed. In the known systems the vehicle is maintained on the average heading in the desired direction when it is subjected only to random forces which tend to change its heading. Such systems introduce an error when the vehicle controlled thereby is subjected to any more or less continuously applied force tending to change its heading, such forces may be due to lack of trim of the vehicle, or a cross wind which, because of the shape of the vehicle, has a tendency to change its heading.

In the past, correction was usually made for the error thus introduced in the system by making manual adjustments of the apparatus. Such apparatus required the attention of the navigator or pilot, and thus in part defeated the purpose of the apparatus. Furthermore, in some uses of automatic steering apparatus it is not possible or feasible to make such corrections manually.

In the steering apparatus of my invention correction is automatically made for the effect upon the heading of the vehicle of such more or less constant forces as may be due to inherent lack of trim of the vehicle, or due to external forces applied to the vehicle in a manner such as to have a similar effect.

While the steering apparatus is in operation, the switch A opens and closes in rapid succession. When the vessel is heading in the desired direction, the length of time that the switch is closed will be the same as the length of time that it is open. When the vessel is turning from the required heading, the length of time that the switch is opened or closed will differ sufficiently to cause the servo-motor 84 to operate the rudder or other steering means in a direction to correct from such deviation from the desired heading.

The switch B will operate similarly, but at less frequent intervals since this switch is open only when the vessel is to the right of its predetermined heading, and closed when the vessel is to the left of the predetermined heading.

Upon consideration of the functions of the capstan 98, it will be apparent to those skilled in the art that the motor 100 might be utilized in any one of a large number of different ways to change the angular relationship between the rudder 12 and the parts of switch A.

Due to the fact that the motors 84 and 100 are continuously in operation, rotating in one direction or the other, the apparatus is very sensitive, and responds very rapidly to any slight deviations of the vessel from the predetermined course. The apparatus is therefore particularly useful for steering aircraft gliders and the like in which changes in direction of flight, due to atmospheric irregularities, may be very rapid.

While the control mechanism is illustrated as being applied to control only the azimuthal course of a vessel, it may, with equal utility, be used to control the elevation of an airplane as well as its azimuthal course, that is, to maintain the airplane in horizontal flight. For the latter purpose the apparatus as a whole might merely be rotated through 90° and used to operate the elevator instead of the rudder.

In its broader aspects the invention is applicable to a large variety of different equipment and apparatus such as marine torpedoes, submarine and various surface vessels, radio or other remotely controlled vehicles, ships and aircraft, and may be used in many other kinds of apparatus in which it is desired to govern the movement of a part, to maintain an element upon a predetermined course, or to determine the orientations of a device.

While I have shown and described a particular embodiment of the invention, it will be apparent to those skilled in the art that it may be embodied in a wide variety of modified forms for the control of a wide variety of different types of apparatus. I therefore desire, by the following claims, to include within the scope of my invention, all such modifications and variations by which substantially the results of the invention may be obtained by the use of substantially the same or equivalent means.

I claim:

1. In a steering control apparatus for maintaining a dirigible vehicle headed in a given direction, said vehicle having steering means for controlling its direction of movement, a servo-motor for operating the steering means, a compass mechanism having a part maintaining a fixed direction, a follow-up element movable with respect to said part, means responsive to relative motion between said part and said element to control the operation of said servo-motor, an operating connection between said servo-motor and said follow-up element, and trim correcting means responsive to the direction of heading of the vehicle with respect to said part for changing the relative position of said follow-up member and said servo-motor.

2. The combination set forth in claim 1, in which said connection comprises a belt, and in which said trim correcting means comprises a motor driven device changing the effective length of said belt.

3. The combination set forth in claim 1 in which said follow-up element is in the form of a pulley rotatable about the axis of said part, said servo-motor includes a rotatable pulley, said operating connection comprises a belt passing around said pulleys and having one end resiliently anchored, and said trim correcting means comprises a reversible capstan to which the other end of said belt is secured.

4. In a steering control apparatus for maintaining a body moving in a given direction, a mechanism having a part maintaining a fixed direction in space, a direction controlling element on said body, a servo-motor for operating said element, a follow-up member, an operating connection between said element and said member effective to move the latter proportionally with movement of the former, means controlled by relative movement between said follow-up member and said part to control the operation of said servo-motor, and means responsive to relative angular movement between said part and the body for increasing or decreasing the effectiveness of said connection depending upon whether the body is directed to one side or the other of the given direction.

5. In an automatic steering mechanism for a vehicle, the combination of a casing rigidly secured to said vehicle, a gyro-compass mounted in said casing and having a vertical gimbal pivot shaft maintaining fixed orientation in space, a pair of flexible resilient switch arms secured to said shaft, a follow-up pulley mounted for pivotal movement about the axis of said shaft, a contact element carried by said pulley and cooperable with one of said switch arms to form a switch A, a second contact element secured to said casing and cooperable with the other of said switch arms to form a switch B, a reversing electric motor, a relay controlled by said switch A and operative to cause rotation of said motor in one direction when said switch A is closed and to rotate in the opposite direction when said switch A is open, a steering element driven by said motor, a sheave moved with said steering element, a capstan, a second reversing electric motor and speed reducing gear train connected to rotate said capstan, a second relay controlled by said switch B and operative to cause rotation of said second motor in one direction when said switch B is closed and to rotate in the opposite direction when said switch B is open, a yielding tension element having one end anchored with respect to said casing, and a belt having one end secured to said tension element and its other end attached to said capstan, said belt passing around said follow-up pulley and said sheave.

6. In an automatic steering apparatus for a vehicle having steering means, the combination of an element having means associated therewith for maintaining it directionally fixed in space, a casing forming a pivotal mounting for said element, said casing being secured to the vehicle, a follow-up pulley mounted for rotary movement on said casing about the axis of said element, a first reversible electric servo-motor connected to control the steering means, a sheave mounted for movement by said first servo-motor, a capstan, a second reversible electric servo-motor connected to drive said capstan, a belt having one end yieldingly anchored with respect to said casing and its other end anchored to said capstan, said belt passing around said follow-up pulley and said sheave, a switch means A controlling said first servo-motor to cause operation of the latter in a direction corresponding to the direction of rotation of said follow-up pulley with respect to said element from a given relative position of said pulley and said element, and a switch means B controlling said second servo-motor to cause operation of the latter in a direction corresponding to the direction of rotation of said casing with respect to said element from a given relative position of said casing and said element.

7. In an automatic steering apparatus for maintaining a body heading in a given direction, the combination of a compass part maintaining its orientation, a follow-up member, a steering mechanism operated in response to relative movement between said compass part and said member, an operating connection between said steering mechanism and said follow-up member, additional means to impart movement to said follow-up member, said additional means and steering mechanism operating contemporaneously and differentially to determine the instantaneous position of said member, and trim correcting means to cause said additional means to apply a component of motion to said member in one direction when the body is directed to the right of the given direction and to apply a component of motion to said member in the opposite direction when the body is directed to the left of the given direction.

8. The combination set forth in claim 7 in which said trim correcting means comprises a switch having one of its contacts carried by the compass part and its other contact carried by the body, at least one of said contacts being yieldingly mounted to permit substantial relative movement between said body and said compass part while being engaged by the other contact, and a stop to limit accurately the movement of the yielding part upon opposite relative movement of said body and said compass part, thereby to assure engagement and disengagement of said contacts at a definite relative position of said body and said compass part.

9. The combination set forth in claim 7 in which said additional means comprises a reversible electric motor, and said trim correcting means comprises an electric switch means operable to control the direction of rotation of said motor.

10. The combination set forth in claim 7 in which said operating connection comprises a belt engaging said follow-up member, said steering mechanism includes a sheave having a pivot moved in response to steering movement of the steering mechanism, said additional means comprises a capstan to which the end of said belt is secured, and in which that portion of the belt between the capstan and the follow-up member passes around said sheave.

11. The combination set forth in claim 7, in which said steering mechanism comprises a reversible electric motor having its direction of rotation controlled by a switch which is respectively closed and open as said member is positioned to one side or the other of a given position with respect to said compass part.

12. The combination set forth in claim 7, in which said trim correcting means comprises a reversible electric motor having its direction of rotation controlled by a switch which is respectively closed or open as said body is directed to the right or left of the given heading as determined by said compass part.

13. The combination set forth in claim 7 in which said compass part forms part of a gyro-compass mechanism having a caging means, and in which means are provided to uncage the said mechanism manually for determining the given heading upon which the body is to be maintained.

14. In an apparatus for automatically steering a vehicle in a given direction, the combination of a compass having a part maintaining a fixed direction in space, a steering member, a servo-motor, a follow-up member, operating connections between said servo-motor and said members, servo-motor control means responsive to the direction of angular displacement of said compass part with respect to said steering member as reflected through said operating connections and said follow-up member, a device responsive to the direction of angular displacement of said compass part and the vehicle, and means controlled by said device to vary the responsiveness of said control means to the angular displacement of said steering member.

15. In an apparatus for automatically steering a vehicle in a given direction, the combination of a compass having a part maintaining a fixed direction in space, a steering member for controlling the directional heading of the vehicle, a servo-motor connected to operate said member, a follow-up steering control system for said servo-motor operable to cause said servo-motor to move said steering member in either direction from a mean position with respect to the vehicle, a device responsive to the direction of angular displacement of the vehicle with respect to said compass part, and means controlled by said device and operating on said follow-up steering control system to change the mean position of said steering member in a direction to correct for the angular displacement of the vehicle with respect to the compass part.

16. The combination set forth in claim 15 in which said means changes the mean position of the steering member at a speed which is much less than the speed at which said steering member may be moved by said servo-motor.

17. The combination set forth in claim 15 in which said device comprises a switch having one of its contacts carried by the compass part and its other contact carried by the vehicle, in which one of said contacts is mounted for yielding in one direction and is limited by a fixed stop against movement in the opposite direction, and in which said means includes a reversible electric motor having its direction of rotation controlled by said switch.

18. In an apparatus for automatically steering a vehicle in a given direction, including a compass having a part maintaining a fixed direction in space, a steering member for controlling the directional heading of the vehicle, a servo-motor connected to operate said member, and a follow-up steering control system for said servo-motor operable in response to a change in heading of the vehicle from the given direction to cause said servo-motor to move said steering member in either direction from a mean position with respect to said compass part which may be required to cause the vehicle to return toward the given direction, the combination of a device responsive to the direction of angular displacement of the vehicle with respect to said compass part, and means controlled by said device and operating on said follow-up steering control system to change the mean position of said steering member in a direction to correct for the angular displacement of the vehicle with respect to the compass part.

LAURENS HAMMOND.